United States Patent
Aggarwal et al.

(10) Patent No.: US 9,552,032 B2
(45) Date of Patent: *Jan. 24, 2017

(54) BRANCH PREDICTION POWER REDUCTION

(75) Inventors: Aneesh Aggarwal, Portland, OR (US);
Ross Segelken, Portland, OR (US);
Kevin Koschoreck, Tigard, OR (US);
Paul Wasson, Tigard, OR (US)

(73) Assignee: NVIDIA CORPORATION, Santa Clara, CA (US)

( * ) Notice: Subject to any disclaimer, the term of this patent is extended or adjusted under 35 U.S.C. 154(b) by 232 days.

This patent is subject to a terminal disclaimer.

(21) Appl. No.: 13/458,542

(22) Filed: Apr. 27, 2012

(65) Prior Publication Data

US 2013/0290640 A1 Oct. 31, 2013

(51) Int. Cl.
*G06F 9/38* (2006.01)
*G06F 1/32* (2006.01)
*G06F 9/30* (2006.01)

(52) U.S. Cl.
CPC ............... *G06F 1/32* (2013.01); *G06F 1/3243* (2013.01); *G06F 9/30058* (2013.01); *G06F 9/38* (2013.01); *Y02B 60/1239* (2013.01)

(58) Field of Classification Search
USPC .................................. 712/239; 713/323, 324
See application file for complete search history.

(56) References Cited

U.S. PATENT DOCUMENTS

| | | |
|---|---|---|
| 4,168,541 A | 9/1979 | DeKarske |
| 4,525,780 A | 6/1985 | Bratt et al. |
| 4,807,110 A | 2/1989 | Pomerene et al. |
| 5,125,085 A | 6/1992 | Phillips |
| 5,325,503 A | 6/1994 | Stevens et al. |
| 5,544,342 A | 8/1996 | Dean |
| 5,623,627 A | 4/1997 | Witt |
| 5,640,532 A | 6/1997 | Thome et al. |
| 5,666,514 A | 9/1997 | Cheriton |
| 5,687,110 A * | 11/1997 | Tran et al. ............... 365/154 |
| 5,724,553 A | 3/1998 | Shigeeda |
| 5,737,765 A | 4/1998 | Shigeeda |

(Continued)

FOREIGN PATENT DOCUMENTS

| | | |
|---|---|---|
| CN | 1659525 | 8/2005 |
| CN | 101523359 | 9/2009 |

(Continued)

OTHER PUBLICATIONS

Aggarwal, Aneesh et al., "Instruction Cache Power Reduction," U.S. Appl. No. 13/346,536, filed Jan. 9, 2012, 32 pages.

(Continued)

*Primary Examiner* — Eric Coleman

(57) ABSTRACT

In one embodiment, a microprocessor is provided. The microprocessor includes instruction memory and a branch prediction unit. The branch prediction unit is configured to use information from the instruction memory to selectively power up the branch prediction unit from a powered-down state when fetched instruction data includes a branch instruction and maintain the branch prediction unit in the powered-down state when the fetched instruction data does not include a branch instruction in order to reduce power consumption of the microprocessor during instruction fetch operations.

21 Claims, 8 Drawing Sheets

(56) References Cited

U.S. PATENT DOCUMENTS

| | | | |
|---|---|---|---|
| 5,784,590 A | 7/1998 | Cohen et al. | |
| 5,809,522 A | 9/1998 | Novak et al. | |
| 5,835,934 A | 11/1998 | Tran | |
| 5,845,317 A | 12/1998 | Pawlowski | |
| 5,848,428 A | 12/1998 | Collins | |
| 5,933,860 A | 8/1999 | Emer et al. | |
| 5,974,508 A | 10/1999 | Maheshwari | |
| 6,021,469 A | 2/2000 | Tremblay et al. | |
| 6,148,374 A | 11/2000 | Pawlowski | |
| 6,247,094 B1 | 6/2001 | Kumar et al. | |
| 6,279,107 B1* | 8/2001 | Tran | 712/239 |
| 6,282,663 B1* | 8/2001 | Khazam | 713/320 |
| 6,334,170 B1 | 12/2001 | Pawlowski | |
| 6,356,990 B1 | 3/2002 | Aoki et al. | |
| 6,389,523 B1 | 5/2002 | Shimazaki et al. | |
| 6,601,161 B2 | 7/2003 | Rappoport et al. | |
| 6,678,792 B2 | 1/2004 | van de Waerdt | |
| 6,718,439 B1 | 4/2004 | Jayavant | |
| 6,978,149 B1 | 12/2005 | Morelli et al. | |
| 7,321,787 B2 | 1/2008 | Kim | |
| 7,360,023 B2 | 4/2008 | Goodrich | |
| 7,369,815 B2 | 5/2008 | Kang et al. | |
| 7,412,570 B2 | 8/2008 | Moll et al. | |
| 7,437,513 B2 | 10/2008 | Saida et al. | |
| 7,475,192 B2 | 1/2009 | Correale, Jr. et al. | |
| 7,487,369 B1 | 2/2009 | Gupta et al. | |
| 7,536,510 B1 | 5/2009 | Thompson | |
| 7,644,294 B2* | 1/2010 | Raghuvanshi | 713/324 |
| 7,689,772 B2 | 3/2010 | Damaraju et al. | |
| 7,869,835 B1 | 1/2011 | Zu | |
| 7,904,658 B2 | 3/2011 | Abadeer et al. | |
| 8,028,180 B2* | 9/2011 | Bonanno et al. | 713/320 |
| 8,335,122 B2 | 12/2012 | Dreslinski, Jr. et al. | |
| 8,352,683 B2 | 1/2013 | Cohen et al. | |
| 8,458,404 B1 | 6/2013 | Delgross et al. | |
| 8,775,740 B2 | 7/2014 | Chinnakonda | |
| 2001/0026465 A1 | 10/2001 | Choi et al. | |
| 2002/0080662 A1 | 6/2002 | Yamazaki et al. | |
| 2002/0112126 A1 | 8/2002 | Hayakawa et al. | |
| 2002/0138700 A1* | 9/2002 | Holmberg | 711/137 |
| 2003/0003943 A1 | 1/2003 | Bajikar | |
| 2003/0156472 A1 | 8/2003 | Satou et al. | |
| 2004/0103253 A1 | 5/2004 | Kamei et al. | |
| 2004/0181654 A1* | 9/2004 | Chen | 712/239 |
| 2005/0132175 A1* | 6/2005 | Henry et al. | 712/239 |
| 2005/0239518 A1 | 10/2005 | D'Agostino et al. | |
| 2005/0246499 A1 | 11/2005 | Saida et al. | |
| 2007/0130450 A1* | 6/2007 | Chiao et al. | 712/239 |
| 2007/0162775 A1* | 7/2007 | Raghuvanshi | 713/320 |
| 2008/0082843 A1* | 4/2008 | Schuler et al. | 713/323 |
| 2011/0055523 A1* | 3/2011 | Kaplan et al. | 712/214 |
| 2011/0083030 A1 | 4/2011 | Doi | |
| 2011/0093658 A1* | 4/2011 | Zuraski et al. | 711/125 |
| 2012/0079303 A1 | 3/2012 | Madduri | |
| 2012/0117362 A1* | 5/2012 | Bhargava et al. | 712/239 |

FOREIGN PATENT DOCUMENTS

| | | |
|---|---|---|
| CN | 101763249 | 6/2010 |
| CN | 102103547 | 6/2011 |
| TW | I257546 | 9/2003 |

OTHER PUBLICATIONS

Aggarwal, Aneesh et al., "Branch Prediction Power Reduction," U.S. Appl. No. 13/458,513, filed Apr. 27, 2012, 49 pages.

Kleen et al., "Optimizing for Instruction Caches, part 1", EE Times, Oct. 29, 2007, retrieved from http://www.eetimes.com/document.asp?doc_id=1275470 on Jan. 28, 2007.

Kleen et al., "Optimizing for Instruction Caches, part 2", EE Times, Nov. 5, 2007, retrieved from http://www.eetimes.com/document.asp?doc_id=1275472 on Jan. 28, 2007.

Livadariu et al., "Optimizing for Instruction Caches, part 3", EE Times, Nov. 12, 2007, retrieved from http://www.eetimes.com/document.asp?doc_id=1275474 on Jan. 28, 2007.

Vanderleest et al., "Storage Question 9: How does Storage Hierarchy Work?", Jan. 26, 2003.

definition of set associative cache. Free Online Dictionary of Computing, Oct. 18, 2004, retrieved from http://foldoc.org/set+associative+cache on Jan. 28, 2014 (2 pages).

The Design of Way-Prediction Scheme in Set-Associative Cache for Energy Efficient Embedded System, Tseng et al, WRI International Conference on Communications and Mobile Computing 2009 (CMC '09), Jan. 6-8, 2009, pp. 3-7 (5 pages).

Computer Architecture Techniques for Power-efficiency, Kaxiras et ai, Morgan & Claypool Publishers, published 2008, ISBN 1598292080, pp. 101-107 (7 pages).

An Accurate and Energy-Efficient Way Determination Technique for Instruction Caches by Early Tab Matching, Chung et al, 4th IEEE International Symposium on Electronic Design, Test and Applications 2008 (DELTA 2008), Jan. 23-25, 2008, pp. 190-195 (6 pages).

Inoue, K. et al.: A High-Performance and Low-Power Cache Architecture with Speculative Way-Selection. IEICE Trans. Electron., vol. E83-C, No. 2 Feb. 2000, pp. 186-194.

* cited by examiner

| CYCLE | 1 | 2 | 3 | 4 | 5 |
|---|---|---|---|---|---|
| FETCH ADDR | | | | | |
| 0x080 | 0x080 DATA AVAILABLE MRU AVAILABLE PREDICTION AVAILABLE | | | | |
| 0x0a0 | | 0x0a0 DATA AVAILABLE PREDICTION AVAILABLE | | | |
| 0x0c0 | I$ FOR SET 3 LOW DATA LRU FOR SETS 4-7 NO BPU ACCESS | | 0x0c0 DATA AVAILABLE MRU AVAILABLE NO BPU ACCESS | | |
| 0x0e0 | | I$ FOR SET 3 HIGH DATA ACCESS BPU | | 0x0e0 DATA AVAILABLE BP BITS AVAILABLE PREDICTION AVAILABLE | |
| 0x100 | | | I$ FOR SET 4 LOW DATA NO BPU ACCESS | | 0x100 DATA AVAILABLE |
| REDIR | | | | REDIRECT TO ADDRESS 0x200 | |
| 0x200 | | | | | I$ FOR SET 8 LOW DATA LRU FOR SETS 8-11 NO BPU ACCESS |

FIG. 11

BRANCH PREDICTION POWER REDUCTION

BACKGROUND

Microprocessors typically employ a branch prediction unit to make a prediction of whether a branch instruction will be taken during execution of the instruction, and to predict the target of a predicted-taken branch. The branch predictions improve flow and reduce the likelihood of forming bubbles in an instruction pipeline. Specifically, by making a branch prediction, the microprocessor does not have to wait until a branch instruction has passed the execute stage of the pipeline before the next instruction can enter the fetch stage in the pipeline. The branch prediction unit predicts whether a conditional jump is most likely to be taken or not taken. The instructions at the predicted target of the branch is then fetched and speculatively executed. If the branch prediction is correct, the instruction pipeline continues to execute instructions while reducing the likelihood of creating bubbles in the pipeline, and the performance of the pipeline is increased. On the other hand, if the branch prediction is incorrect, then the speculatively executed or partially executed instructions are discarded and the pipeline starts over with the correct branch target incurring a delay.

In one example implementation, a branch prediction unit is powered up in parallel with an instruction cache when an instruction fetch is performed. The branch prediction unit is powered up to look up a branch prediction for the instruction data being fetched from the instruction cache. In other words, every time instruction data in the instruction cache is looked up, the branch prediction unit is also powered up.

However, there are various limitations with this approach for controlling the branch prediction unit. For example, in cases where an instruction fetch is performed on a cacheline that was previously fetched from the instruction cache, and the fetched instruction data contains no branches, the power consumed to look up the branch prediction in the branch prediction unit is wasted, because the instruction data does not include a branch instruction. In other words, in this approach the branch prediction unit is powered up during every instruction fetch operation regardless of whether the fetched instruction data does or does not include a branch instruction. Accordingly, this approach for controlling the branch prediction unit generates unnecessary power consumption, when the branch prediction unit is powered up for instruction fetches of instruction data that does not include a branch instruction.

BRIEF DESCRIPTION OF THE DRAWINGS

FIG. 11 shows a timeline of example branch prediction unit operation according to the present disclosure.

DETAILED DESCRIPTION

The present discussion sets forth novel systems and methods for controlling a branch prediction unit of a microprocessor in such a manner that power consumption is reduced without significantly reducing performance of the microprocessor. More particularly, the present discussion relates to optimizing control of a branch prediction unit for power reduction by tracking whether previously fetched instruction data stored in an instruction cache includes any branches. For example, when an instruction is previously fetched from the instruction cache, the instruction is validated as including a branch instruction or not including a branch instruction at a point in the processing pipeline of the microprocessor. This tracking information may be stored in the instruction cache and used to control the branch prediction unit during later fetches of the instruction from the instruction cache. In particular, the branch prediction unit is powered down (or maintained in a powered-down state) when a previously fetched cacheline that includes no branch instructions is fetched from the instruction cache. Accordingly, needless activations of the branch prediction unit can be reduced. In this way, power consumption may be reduced relative to approaches where a branch prediction unit is powered up every time an instruction is fetched from the instruction cache.

Furthermore, the tracking information may be stored in the branch prediction unit and used to determine whether a cacheline at a target address of a taken branch includes a branch instruction. For example, when the branch prediction unit predicts a taken branch and a redirection to the target address occurs, the tracking information may be used to control the branch prediction unit for the initial instruction fetches following the redirection. In particular, the branch prediction unit is powered down (or maintained in a powered-down state) if the initial cachelines following the redirection do not include a branch instruction. If the branch prediction unit is prevented from being powered up and there are no branches in the associated instructions following the redirection, power is saved at no performance cost relative to an approach where the branch prediction unit is powered up every time an instruction is fetched from the instruction cache.

Moreover, by tracking whether target instructions include branch information, the branch prediction unit may be selectively powered down (or maintained in a powered-down state) immediately following a redirection before information is available from the instruction cache. Accordingly, power consumption may be reduced even during one or more clock cycles immediately following a redirection. In contrast, if the branch prediction unit is controlled just based on the tracking information stored in the instruction cache, a delay in control may be created after the redirection, while waiting for the tracking information to become available from the instruction cache.

Figure 1:
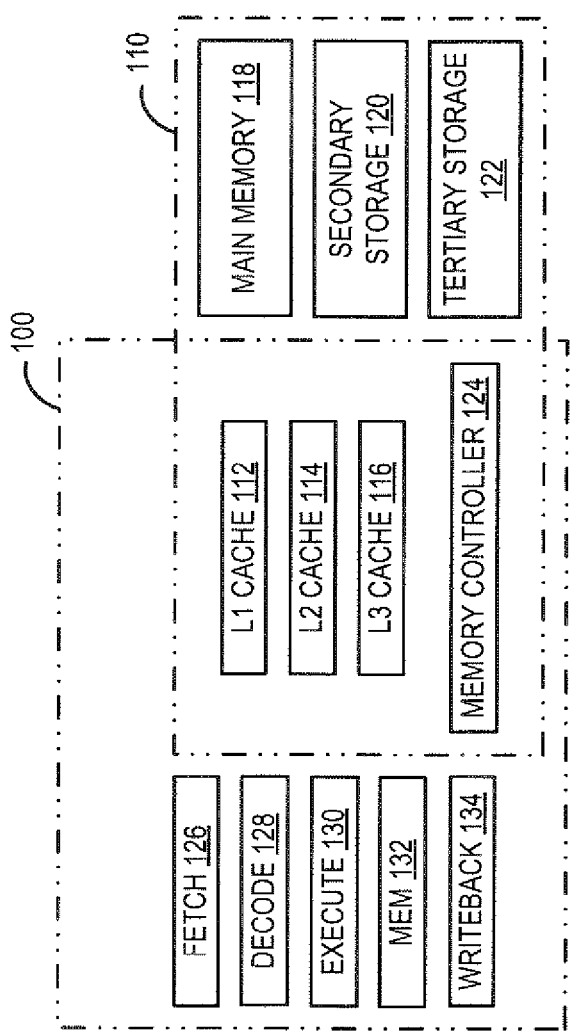
FIG. 1 shows an embodiment of a microprocessor of a computing device according to the present disclosure.

FIG. 1 schematically depicts a microprocessor 100 that may be employed in connection with the systems and methods described herein. The microprocessor 100 variously includes and/or communicates with a memory hierarchy 110, which includes an L1 processor cache 112, an L2 processor cache 114, an L3 processor cache 116, main memory 118 (e.g., one or more DRAM chips), secondary storage 120 (e.g., magnetic and/or optical storage units) and/or tertiary storage 122 (e.g., a tape farm). It will be understood that these memory/storage components are listed in increasing order of access time and capacity, though there are possible exceptions. A memory controller 124 handles the protocol and provides the signal interface required of main memory 118 and typically to schedule memory accesses. The memory controller can be implemented on the processor die or on a separate die. It is to be understood that the memory hierarchy provided above is non-limiting and other memory hierarchies may be used without departing from the scope of this disclosure. The depicted memory hierarchy is an exemplary illustration, and it will be understood that other hierarchies may be employed without departing from the spirit of the present disclosure.

The microprocessor 100 includes fetch logic 126, decode logic 128, execution logic 130, mem logic 132, and writeback logic 134. Fetch logic 126 is configured to interact with instruction memory to retrieve instructions from the memory hierarchy 110 (typically from the dedicated L1 instruction cache backed by L2-L3 caches and main memory). A branch prediction unit 220 (shown in FIG. 2) that is operatively coupled with the fetch logic 126 selectively provides branch predictions for instructions that are fetched from the instruction cache 206. The branch prediction unit 220 may be controlled according to systems and methods described herein in order to reduce power consumption by the microprocessor 100 when performing instruction fetch operations as well as other operations.

Decode logic 128 decodes fetched instructions, for example by parsing opcodes, operands, and addressing modes. Upon being parsed, the instructions are then executed by execution logic 130. For operations that produce a result (for example, as opposed to those that perform a branch to another location in the executing program), writeback logic 134 writes the result to an appropriate location, such as a processor register. In load/store architectures, mem logic 132 performs load and store operations, such as loading an operand from main memory into a processor register.

It should be understood that the above five stages are somewhat specific to and included in a typical reduced instruction set computing (RISC) implementation. More generally a microprocessor may include fetch, decode, and execution logic, with mem and write back functionality being carried out by the execution logic. The present disclosure is equally applicable to these and other microprocessor implementations.

In the described examples, instructions may be fetched and executed one at a time, possibly requiring multiple clock cycles. During this time, significant parts of the data path may be unused. In addition to or instead of single instruction fetching, pre-fetch methods may be used to improve performance and avoid latency bottlenecks associated with read and store operations (i.e., the reading of instructions and loading such instructions into processor registers and/or execution queues). Moreover, multiple instructions may be fetched at any given time to improve performance.

Figure 2:
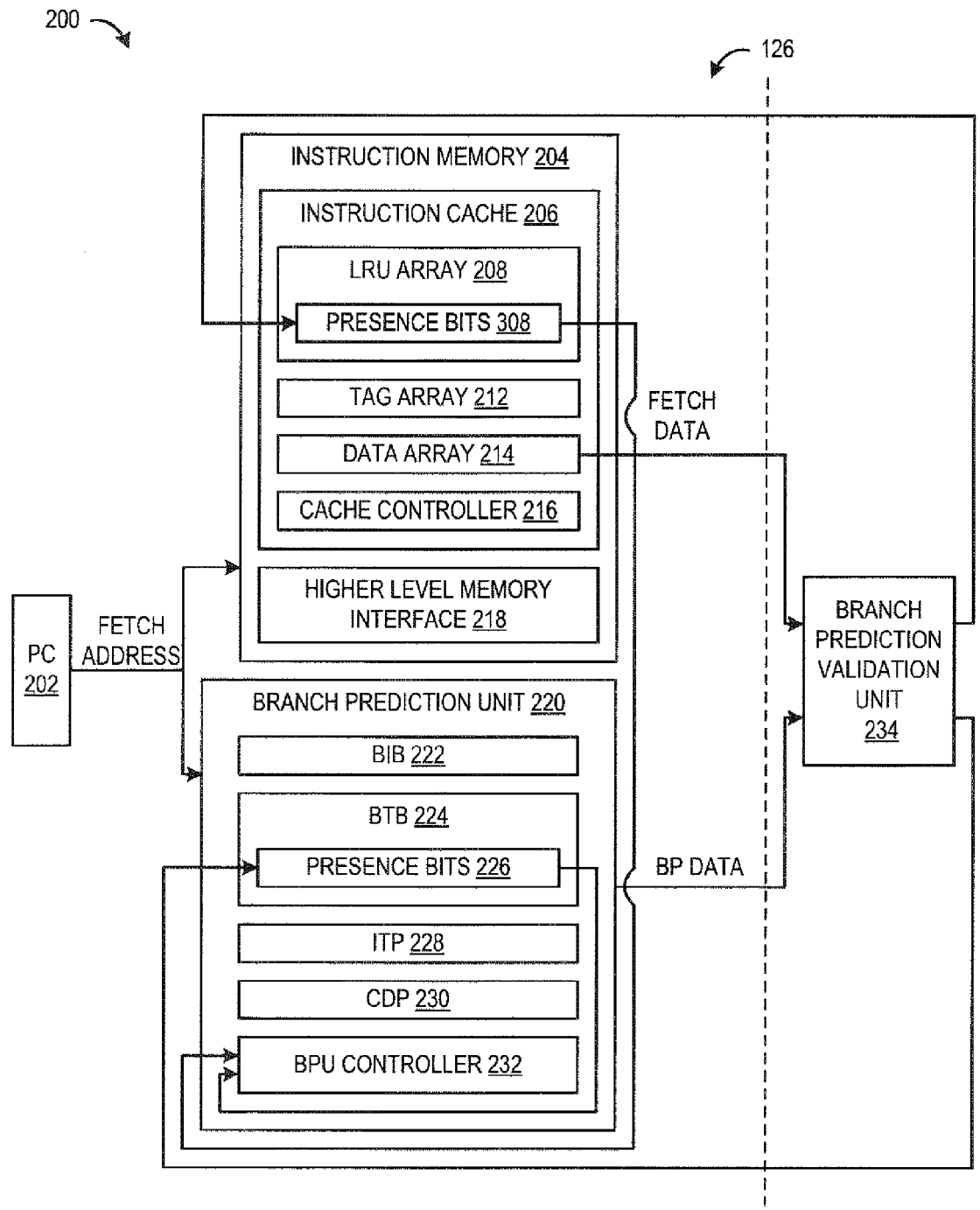
FIG. 2 shows an embodiment of a computer processing pipeline according to the present disclosure.

To achieve higher performance, the exemplary microprocessors may be pipelined to exploit instruction level parallelism and more efficiently utilize the data path so that there are multiple instructions in different stages of execution at the same time. FIG. 2 shows an embodiment of a processing pipeline 200 that may be employed in the microprocessor 100 (shown in FIG. 1) according to the present description. More particularly, FIG. 2 focuses on a portion of the instruction fetch (IF) stage 126 of the processing pipeline 200. The present discussion focuses on controlling components in the IF stage 126 during instruction fetch operations in order to reduce power consumption of the processing pipeline. The IF stage 126 includes a program counter 202 that keeps track of a memory address of an instruction to be executed in an instruction sequence of the processing pipeline 200. The program counter 202 sends an address of an instruction to be executed to an instruction memory 204 and a branch prediction unit 220. The instruction memory 204 includes an instruction cache 206 and an interface to higher level memory storage 218 (e.g., higher level cache and other memory subsystems). Note that the instruction memory and branch prediction unit are presented in a simplified form and it will be appreciated that these logical units may additionally or alternatively include various other structures and possibly multiple pipeline stages. For example, in some embodiments, the instruction memory may include on-chip memory that includes various caches located on a processor core. Further, a higher level memory interface may interact with memory off-chip, such as main memory that is not located on the processor core to load instruction data into the instruction memory from main memory or other off-chip storage.

The instruction cache 206 acts as a buffer memory between the higher level memory storage interface 218 and the stages of the processing pipeline 200. When instructions are fetched, the data at the location referenced by the program counter 202 locations requested by the instructions is copied into the instruction cache 206 to be sent through the processing pipeline 200. If the same instruction data is used frequently in a set of program instructions, storage of these instructions in the instruction cache 206 yields an increase in throughput because retrieval of instructions from higher level memory storage via the interface 218 is reduced. If data for an instruction is not stored in the instruction cache 206, higher level memory storage is accessed via the interface 218 to retrieve the data.

Figure 3:
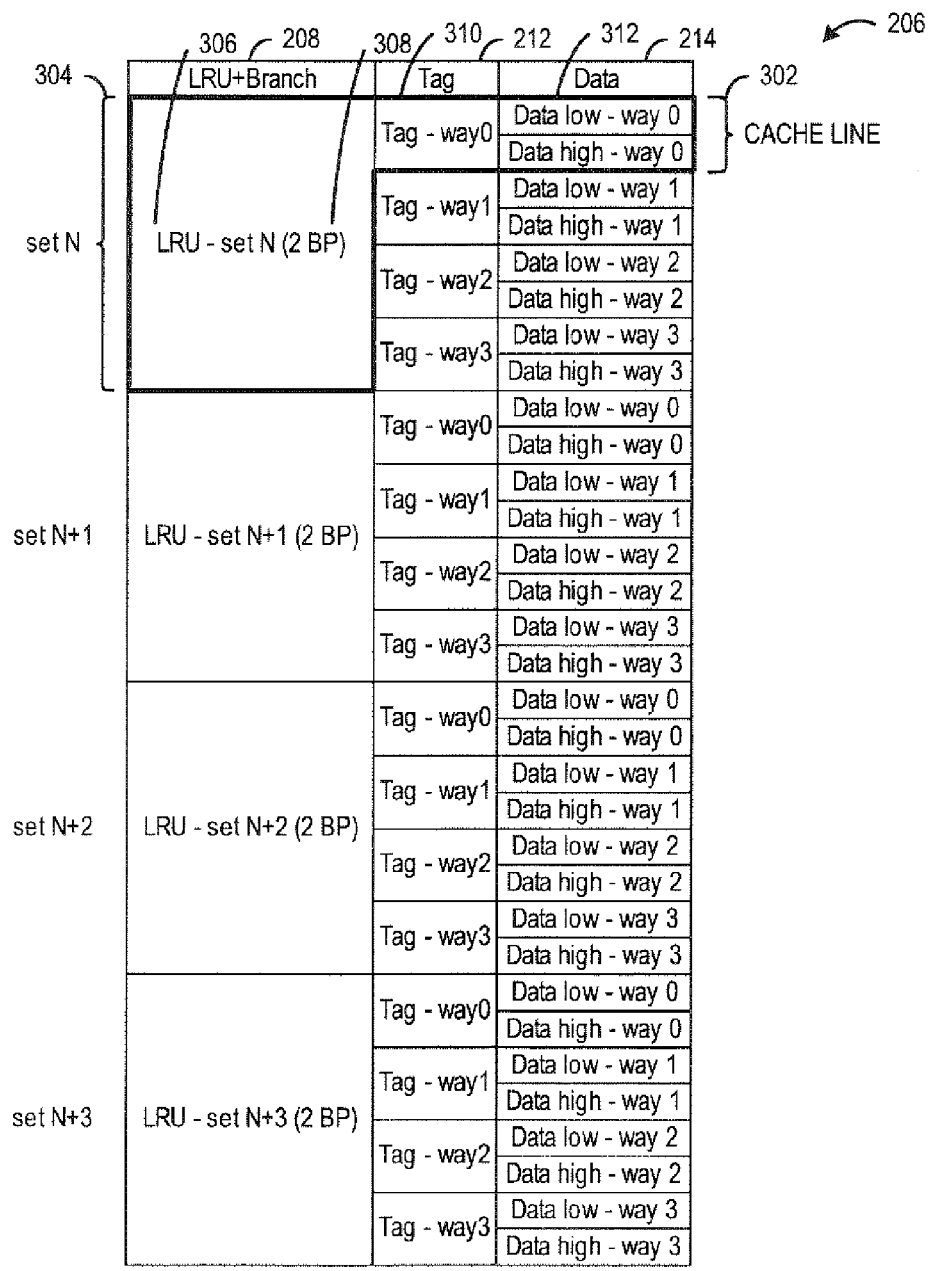
FIG. 3 schematically shows a portion of an embodiment of an instruction cache.

FIG. 3 shows a portion of the instruction cache 206, and will be referred to herein for discussion of the instruction cache 206. The instruction cache 206 includes a memory space that is divided into a plurality of memory locations that may be referred to as cachelines, an example of which is indicated at 302. In one particular example, each cacheline is sixty four bytes. The plurality of cachelines is logically divided into a plurality of cacheline sets, an example of which is indicated at 304. In one particular example, the instruction cache includes five hundred twelve cacheline sets, four (i.e., sets N–N+3) of which are shown in FIG. 3. It will be appreciated that the instruction cache may include any suitable number of cacheline sets, each of the cachelines may be any suitable size, and the cachelines may vary without departing from the scope of the present disclosure.

The number of cachelines in a cacheline set may define the number of locations in the instruction cache to which any particular location in main memory can be mapped. In the illustrated example, the instruction cache includes a four-way set-associative array, where each set of cachelines is associative and includes four ways where instruction data can be stored. It will be appreciated that the instruction cache may include any suitable number of ways or data locations in a cacheline set (e.g., two-way, eight-way, fully associative, etc.) without departing from the scope of the present disclosure.

Each cacheline of the instruction cache 206 is divided into different bit fields that provide different information. The LRU bits 306 indicate a least-recently-used (or accessed) way in a cacheline set. The branch presence bits 308 provide a branch presence indication that indicates whether or not a most-recently-used way in a cacheline set includes a branch instruction. Note that the branch presence bits are implemented on a per-set basis in order to reduce storage requirements. However, it will be appreciated that the branch presence bits could be implemented on a per-cacheline basis or as another suitable branch presence indication without departing from the scope of the present disclosure. In one particular example, the branch presence bits are set to indicate that instruction data stored in a most-recently-used way includes a branch instruction, and the branch presence bits are cleared to indicate that instruction data stored in a most-recently-used way does not include a branch instruction. The tag bits 310 identify a designated way where instruction bytes corresponding to the address is stored. The data bits 312 store the instruction bytes corresponding to the address. In the illustrated example, the data bits 312 of each cacheline are split into a low half and a high half, because each instruction fetch read of the instruction cache retrieves a half of a cacheline of data if there is a hit. It will be appreciated that any suitable amount of data may be retrieved during an instruction fetch read without departing from the scope of the present disclosure.

The different bit fields of each of the cachelines are organized into different arrays that are controlled by a cache controller 216. Specifically, the instruction cache 206 includes an LRU array 208, a tag array 212, and a data array 214. The LRU array 208 includes the LRU bits 306 and the presence bits 308 for each cacheline set in the instruction cache 206. The tag array 212 includes the tag bits 310 for each cacheline in the instruction cache 206. The data array 214 includes the data bits 312 for each cacheline in the instruction cache 206. Note that the branch presence bits could be stored in any suitable array of the instruction cache or other location without departing from the scope of the present disclosure.

The cache controller 216 is configured to look up (a.k.a., access, or activate) any designated location in any of the LRU array 208, tag array 212, and/or the data array 214 to retrieve the corresponding bits, throughout an instruction fetch operation. It will be appreciated that the instruction cache is provided in simplified form, and in some implementations, the instruction cache may include alternative or additional array structures that hold additional data without departing from the scope of the present disclosure. Note in some implementations the default state of the instruction cache 206 is a powered-down state or an off state, and the cache controller 216 is configured to selectively power up the instruction cache, or more particularly, arrays in the instruction cache to look up data.

The branch prediction unit 220 is configured to predict whether a branch will be taken when a branch instruction is executed in the processing pipeline 200. The branch prediction unit 220 includes prediction structures that store a state used to predict the existence and direction of branches in the fetched data. The prediction structures of the branch prediction unit 220 may be powered up in parallel with the arrays of the instruction cache 206. The branch prediction unit 220 provides a prediction of the existence and direction of all branches, as well as the target of the first taken branch in the instruction data fetched from the instruction cache 206. The branch prediction is produced by the branch prediction unit 220 in the same pipeline stage (or clock cycle) that the instruction cache 206 produces the fetched instruction data, assuming a cache hit. In one particular example, the instruction cache 206 and the branch prediction unit 220 take two clock cycles from the start of the look up/power up to delivery of the instruction data/branch prediction. Note that the branch prediction unit 220 and the instruction cache 206 need not to be accessed at the same time. It will be appreciated that any suitable configuration of the processing pipeline may be used without departing from the scope of the present disclosure.

In the illustrated embodiment, the branch prediction unit 220 includes prediction structures including a branch information buffer 222, a branch target buffer 224, an indirect target buffer 228, and a conditional direction predictor 230. A branch controller 232 is configured to control operation of these structures to make a branch prediction. More particularly, the branch controller 232 commands these structures to power up or power down according to the control strategies describe herein in order to reduce power consumption. Note in some implementations the default state of the branch prediction unit 220 is a powered-down state or an off state, and the branch controller 232 is configured to selectively power up the branch prediction unit, or more particularly, prediction structures in the branch prediction unit to look up data.

The branch information buffer (BIB) 222 stores a location and a type of branch stored at a given address, parcel, way, etc. Examples of different types of branches that may be stored in the branch information buffer 222 include direct, indirect, conditional, unconditional, etc. The branch information buffer 222 may be looked up by the branch controller 232 to generate a branch prediction for an instruction being fetched from the instruction cache 206. The branch target buffer (BTB) 224 stores target addresses for direct branches that are taken. The branch target buffer 224 includes branch presence bits 226 that characterize a branch presence indication corresponding to each target address in the branch target buffer 224. The branch presence bits 226 indicate whether instruction data stored at a target address includes a branch instruction. The branch presence bits 226 may be used by the branch controller 232 to determine whether to power up or power down structures of the branch prediction unit 220 for instruction fetches following a redirection. The indirect target buffer (ITP) 228 stores target addresses for indirect branches that are taken. Although the illustrated embodiment shows the branch presence bits 226 being stored in the branch target buffer 224, in some embodiments, the branch presence bits 226 additionally may be stored in the indirect target buffer 228 or any other suitable structure in the branch prediction unit 220. Accordingly, the branch controller 232 may power up various prediction structures to look up the branch presence bits as well as the branch prediction. The conditional direction predictor (CDP) 230 stores a predicted direction (e.g., taken/not-taken) for conditional branches. It will be appreciated that the branch prediction unit is provided in simplified form, and in some implementations, the branch prediction unit may include alternative or additional structures that hold additional data without departing from the scope of the present disclosure. Note that the branch presence bits 226 are maintained in the branch prediction unit 220 separate from the branch presence bits 308 that are maintained in the instruction cache 206. The branch presence bits 226 may be used by the branch prediction unit 220 to determine whether instruction data at a target address of a branch includes a branch instruction when the branch presence bits 308 are not available from the instruction cache 208 due to a redirection.

Returning to discussion of the instruction cache at a high level, during an instruction fetch operation when the program counter 202 initiates an instruction fetch request, the cache controller 216 determines a cacheline set where an instruction may be stored based on the address received from the program counter 202. In one example, the cache controller 216 activates all four ways of the tag array 212 and the data array 214 for the cacheline set to determine whether there is a hit or miss in the cacheline set. Note that in some implementations, the cache controller 216 activates the tag array 212 and the data array 214 in parallel to look up the tags and data for the cacheline set. For cache hits, the cache controller 216 outputs the instruction from the instruction cache 206 to a register in the instruction decode stage 128 of the processing pipeline. In subsequent clock cycles after a cache hit, the cache controller 216 fetches instructions from sequential entries in the instruction cache until a pipeline stall occurs, or until there is a redirection due to a branch or event.

In one example, the cache controller 216 is configured to determine a most-recently-used (MRU) way in a designated cacheline set based on the LRU bits 306. The cache controller 216 may use the most-recently-used way to determine which instruction data is being fetched for the purpose of branch prediction generation. It will be appreciated that the cache controller may determine a most-recently-used way in a cacheline set in any suitable manner without departing from the scope of the present disclosure.

In one example implementation, the cache controller 216 is configured to look up LRU bits for four consecutive sets of cachelines in a single read operation of the LRU array 208 in a clock cycle. In other words, one look up of the LRU bits identifies the leastrecently-used way in each of four cacheline sets. The number of cacheline sets that correspond to the read operation is based on the implementation of the instruction cache, and more particularly, the number of LRU bits used to describe the ways in a cacheline set and the size of a cacheline. It will be appreciated that LRU bits for any suitable number of cacheline sets may be returned from a single read operation without departing from the scope of the present disclosure.

The organization of the LRU array 208 enables information for multiple sequential fetches to be stored from one look up of the LRU array. This data can be used in a control strategy of the branch prediction unit 220 to selectively disable activation of the branch prediction unit 220 during fetches of instructions that do not include a branch instruction. In one example, the LRU array 208 includes branch presence bits 308 for each cacheline set in the instruction cache 206. The branch presence bits 308 indicate whether a most-recently-used way in a corresponding cacheline set includes a branch instruction. In the illustrated example, the branch presence bits 308 include two branch presence bits per cacheline set. Each of the two branch presence bits represent a different data half of a cacheline (e.g., one bit for each of the low data half and the high data half). The branch presence bits 308 are looked up with the LRU bits 306. In most cases, the branch presence bits for a cacheline set are looked up prior to a sequential instruction fetch of a most-recently-used way in the cacheline set. Moreover, the branch presence bits are made available for use by the branch controller 232 to determine whether to power up or power down the branch prediction unit 220 on a sequential instruction fetch of the next instruction.

In one example, the branch controller 232 is configured to receive the branch presence bits 308 corresponding to a most-recently-used way in a cacheline set from the instruction cache 206. During an instruction fetch of instruction data from the most-recently-used way, if the branch presence bits indicate that the instruction data from the most-recently-used way includes a branch instruction, the branch controller 232 is configured to power up the branch prediction unit from a powered-down state to look up a branch prediction for the branch instruction. In one example, the branch controller 232 is configured to power up the branch information buffer 222 from a powered-down state to generate the branch prediction. Additionally or alternatively, the branch controller 232 may power up other structures of the branch prediction unit 220 to generate the branch prediction. If the branch presence bits indicate that the instruction data from the most-recently-used way does not include a branch instruction, the branch controller 232 is configured to maintain the branch prediction unit 220 in a powered-down state during the instruction fetch. Since the branch presence bits indicate that there is no branch instruction in the instruction data being fetched, it is not necessary to power up the branch prediction unit 220. Accordingly, needless activations of the branch prediction unit 220 may be reduced relative to approaches where the branch prediction unit is powered up during every instruction fetch operation.

In some embodiments, the branch presence bits not only indicate the presence of a branch in a cacheline, but also indicate the types of branches present in the cacheline. As such, the branch controller may know exactly which prediction structures should be powered up or left powered down within the branch prediction unit based on the type of branch indicated by the presence bits. In one example, the branch controller 232 is configured to power up designated prediction structures within the branch prediction unit from a powered-down state based on the type of branch instruction indicated by the branch presence bits. For example, if a cacheline only includes a direct unconditional branch, the branch presence bits could indicate that the BIB and BTB should be powered up, but the ITP and CDP should be powered down. The determination on the extent to which the branch presence bits represent for this purpose may be based on a tradeoff of added power consumption to store the additional bits to describe the type of branches vs. the power saved due to powering down un-needed BPU structures.

Note that in some cases, the LRU bits are looked up to make the branch presence bits available to the branch prediction unit prior to when the LRU bits would otherwise be looked up for the purpose of replacing a way in the instruction cache. In this example, the LRU array is looked up two clock cycles before the first sequential access to a new LRU data entry. Further, note that in this example, data is available two clock cycles after a look up is performed by accessing one of the arrays. It will be appreciated that the processing speed or number of clock cycles to retrieve data may differ without departing from the scope of the present disclosure.

In some embodiments, the cache controller 216 is configured to set the branch presence bits to power up of the branch prediction unit 220 from a powered-down state responsive to a cacheline in the instruction cache being filled with instruction data. For example, instruction data may be retrieved from main memory 218 or another memory location to fill a cacheline in the instruction cache. By setting the branch presence bits when the cacheline is originally filled into the instruction cache 206, the branch presence bits may be placed in a default state. In other words, by setting the branch presence bits, the branch prediction unit 220 can be powered up upon the first and later fetches of the instruction data from that cacheline, until a branch prediction validation unit 234 can validate whether or not the instruction data in that cacheline includes a branch instruction.

In most cases, the branch controller 232 may use the branch presence bits 308 from the LRU array 208 of the instruction cache 206 to determine whether instruction data does include a branch instruction, and correspondingly whether to power up or power down the branch prediction unit 220 during the sequential instruction fetch of that instruction data. In particular, since the branch presence bits that characterize instruction data at a memory location are fetched prior to an instruction fetch of the instruction data at the memory location, the branch presence bits may be made available to the cache controller as well as the branch controller in the branch prediction unit. However, in instruction fetches following a redirection, the branch presence bits 308 may not be available for use by the branch controller 232 since it may take one or more clock cycles for a look up of the LRU array 208 to become available. In order to control the branch prediction unit 220 during the instruction fetches following a redirection, branch presence bits 226 are stored in the branch target buffer 224 (or a different prediction structure) of the branch prediction unit 220. The branch presences bits 226 indicate whether instruction data stored at a target address of a predicted branch includes a branch instruction. The presence bits 226 are used by the branch controller 232 to determine if the data at a target address includes a branch instruction, and correspondingly whether to power up or power down the branch prediction unit 220 after redirection to that target address.

In one example, the branch controller 232 is configured to predict that a branch will be taken in an instruction fetched from the instruction cache 206. For example, the branch controller 232 may make the prediction by looking up the instruction in the branch information buffer 222. Further, the prediction may include the target address of the taken branch and the associated presence bits 226, which may be looked up in the branch target buffer 224 (or the indirect target buffer 228 in case of an indirect branch). If the branch presence bits for the target address of the branch indicate that instruction data stored at the target address includes a branch instruction, the branch controller 232 is configured to power up the branch prediction unit 220 to look up a branch prediction for the fetched instruction bytes at the target of the branch.

In some embodiments, the branch presence bits may indicate which type of branch instruction is stored at the target address, and the branch controller is configured to power up designated prediction structures within the branch prediction unit based on the type of branch instruction indicated by the presence bits (and correspondingly maintain prediction structures in a powered-down state that are not needed for the indicated type of branch instruction). If the branch presence bits for the target address of the branch indicate that the instruction data stored at the target address does not include a branch instruction, the branch controller 232 is configured to maintain the branch prediction unit 220 in a powered-down state during the instruction fetch. Accordingly, needless activations of the branch prediction unit 220 during instruction fetches following a redirection may be reduced relative to approaches where the branch prediction unit is powered up during every instruction fetch operation.

In some embodiments, the branch controller 232 is configured to set the branch presence bits to power up of the branch prediction unit 220 responsive to a new target address being allocated in the branch target buffer 224. For example, a new target address may be allocated to the branch target buffer after a branch instruction having the target address is executed. By setting the branch presence bits when the new target address is originally allocated to the branch target buffer 224, the branch presence bits may be placed in a default state. In other words, by setting the branch presence bits, the branch prediction unit 220 can be allowed to power up upon the first time the instruction data from the target address is fetched. Further, after instruction data stored at the new target address is fetched from the instruction cache 206 and a branch prediction is performed, the branch controller 232 is configured to update the branch presence bits 226 to indicate whether the instruction data includes a branch instruction based on the branch prediction.

After instruction data is fetched from the instruction cache 206, the instruction data moves through the processing pipeline 200. At a stage in the processing pipeline 200 downstream of the instruction fetch stage 126, the branch prediction validation unit 234 determines whether the instruction data includes a branch instruction. Further, the branch prediction validation unit 234 validates a portion of a branch prediction generated by the branch prediction unit 220 for the instruction data. In this example, the branch prediction validation unit 234 validates the branch presence and targets which can be determined by the instruction bytes. The branch prediction validation unit 234 passes the validation of the instruction data back to the instruction cache 206 to update the presence bits 308. Accordingly, the presence bits may be updated to accurately reflect the presence of branch instructions in previously fetched instruction data, which may result in more accurate control of the branch prediction unit. It will be appreciated that the branch prediction validation unit 234 may be located in any suitable stage of the processing pipeline without departing from the scope of the present disclosure.

Note that the branch prediction validation unit 234 is shown in simplified form, and in some implementations, the processing pipeline may include multiple branch predication validation units that validate different portions of a branch prediction.

In one example, the branch prediction validation unit 234 is configured to validate fetched instruction data for the presence of a branch instruction. If there is no branch instruction in the fetched instruction data, the branch prediction validation unit 234 is configured to update the branch presence bits 308 in the LRU array 208 as well as the branch presence bits 226 in the branch target buffer 224 to maintain the branch prediction unit 220 in a powered-down state during a later fetch of that instruction data. If there is a branch instruction in the fetched instruction data, the branch prediction validation unit 234 is configured to update the branch presence bits 308 in the LRU array 208 as well as the branch presence bits 226 in the branch target buffer 224 to power up the branch prediction unit 220 from a powered-down state to look up a branch prediction during a later fetch of that instruction data. Note that updating the branch presence bits may include maintaining the branch presence bits in their current state. For example, if the branch presence bits are set indicating that the instruction data includes a branch instruction and the branch prediction validation unit verifies the presence of the branch instruction in the instruction data, then the branch prediction validation unit may send the validation to the cache controller and the branch controller, and they may maintain the branch presence bits in their current state.

In some cases, if the branch prediction unit 220 is prevented from being powered up and there is a branch instruction in the fetched instruction data, the branch prediction validation unit 234 may discover the branch instruction. In one example, the branch prediction validation unit 234 is configured to determine whether the branch prediction unit 220 was powered up during an instruction fetch. If the branch instruction was not predicted due to the branch prediction unit 220 being powered down, the branch prediction validation unit 234 is configured to re-fetch the branch instruction. Further, the branch prediction validation unit 234 is configured to power up the branch prediction unit 220 to look up a branch prediction for the re-fetched instruction data including the branch instruction. The branch prediction validation unit 234 validates the branch prediction for the re-fetched instruction and passes the validation of the branch instruction to the branch prediction unit 220. The branch controller 232 updates the presence bits 226 based on the validation.

Figure 4:
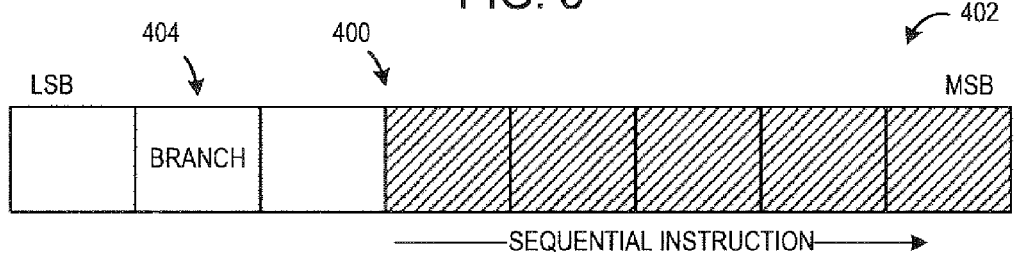
FIG. 4 shows a scenario where a redirection occurs to the middle of a cacheline.

Turning to FIG. 4, in some cases, a branch may cause a redirection 400 to a target address somewhere in the middle of a cacheline 402, where there is a branch instruction 404 in the cacheline 402 before the point of the redirection 400, and there are no branches in the cacheline 402 after the point of the redirection 400. In this case, the branch prediction validation unit 234 would typically report that there were no branches in the fetched data to the cache controller 216, because the fetched data before the point of the redirection 400 is not intended to be used further in the processing pipeline 200. If this result would be used to clear the associated branch presence bits 308 in the LRU array 208, then if the same instruction data were fetched later in a sequential manner where all data in the cacheline would be used, the branch prediction unit 220 would be incorrectly prevented from powering up and performing a branch prediction. In order to reduce the likelihood of a false update of the branch presence bits 308, in some embodiments, the cache controller 216 is configured to if the instruction data is fetched due to a redirection, disallow an update of the branch presence bits 308 in the LRU array 208. In other words, the cache controller 216 updates the branch presence bits 308 in the LRU array 208 when the branch prediction validation unit 234 has considered all branches in the fetched instruction data.

Furthermore, upon determining that fetched instruction data after a redirection includes a branch instruction and validating a branch prediction for the branch instruction, the branch prediction validation unit 234 passes the validation of the instruction data back to the branch prediction unit 220 to update the presence bits 226. In one example, the branch prediction validation unit 234 is configured to after instruction data is fetched from the instruction cache 206, validate the fetched instruction data for the presence of a branch instruction. If there is no branch instruction in the fetched instruction data, the branch prediction validation unit 234 is configured to update the branch presence bits 226 to maintain the branch prediction unit 220 in a powered-down state during an instruction fetch of instruction data at the target address of the branch. If there is a branch instruction in the fetched instruction data, the branch prediction validation unit 234 is configured to update the branch presence bits 226 to power up the branch prediction unit 220 to look up a branch prediction during an instruction fetch of instruction data at the target address of the branch.

In some cases, if the branch prediction unit 220 is prevented from being powered up and there is a branch instruction in the fetched instruction data, the branch prediction validation unit 234 may discover the branch instruction. In one example, the branch prediction validation unit 234 is configured to determine whether the branch prediction unit 220 was powered up during the instruction fetch. If the branch instruction was not predicted due to the branch prediction unit 220 being powered down, the branch prediction validation unit 234 is configured to re-fetch the branch instruction. Further, the branch prediction validation unit 234 is configured to power up the branch prediction unit 220 from a powered-down state to look up a branch prediction for the re-fetched instruction data including the branch instruction. The branch prediction validation unit 234 validates the branch prediction for the presence of a branch instruction in the re-fetched instruction data and passes the validation of the branch instruction to the branch prediction unit 220. The branch controller 232 updates the presence bits 226 based on the validation. In this case, the instruction fetches and predictions performed after the initial fetch of the instruction data are wasted, which both increases power and lowers performance in the short-term. However, the power and performance penalties are taken in order to increase accuracy of branch prediction for future fetches of the instruction data. This may provide greater increases in performance and reductions in power consumption in the long-term. In other words, the presence bits may be updated to accurately reflect the presence of branch instructions in previously fetched instruction data, which may result in more accurate control of the branch prediction unit, and an overall increase in performance and a reduction in power consumption.

Note in the above discussion that various components are cited as updating the branch presence bits in the instruction cache and the presence bits in the branch prediction unit. It will be appreciated that any suitable component may update the branch presence bits depending on implementation of the processing pipeline in the microprocessor without departing from the scope of the present disclosure. For example, the branch prediction validation unit may update the branch presence bits in the instruction cache directly. In another example, the branch prediction validation unit may pass a validation to the cache controller of the instruction cache and the cache controller may update the branch presence bits. Likewise, the branch prediction validation unit may update the branch presence bits in the branch prediction unit directly. In another example, the branch prediction validation unit may pass a validation to the branch controller of the branch prediction unit and the cache controller may update the branch presence bits.

Figure 5:
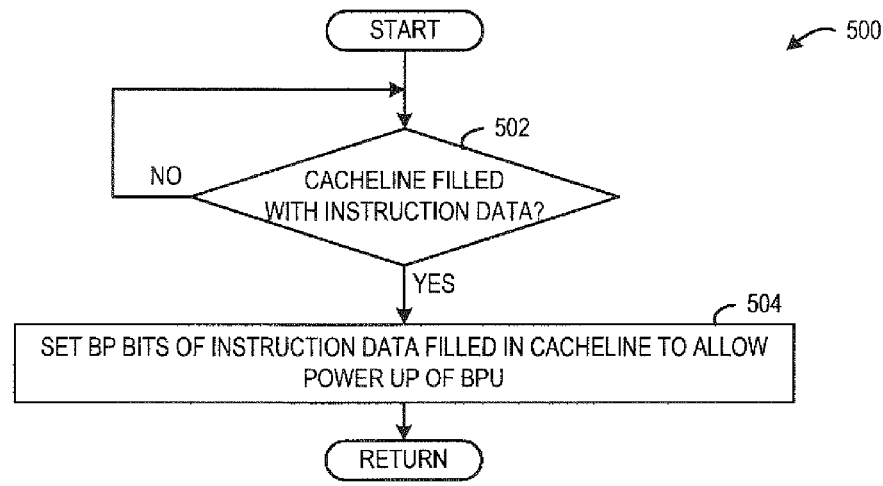
FIGS. 5-10 show embodiments of methods for controlling a microprocessor.

FIG. 5 shows an embodiment of a method 500 for controlling a microprocessor to reduce power consumption. More particularly, the method 500 is performed to make sure that a branch prediction unit is powered up to generate a branch prediction when a newly filled cacheline is fetched from an instruction cache. The method 500 may be employed as part of a control strategy to reduce power consumption by a branch prediction unit of the microprocessor during sequential instruction fetches from an instruction cache. In one example, the microprocessor 100 shown in FIG. 1 including the instruction cache 206 shown in FIG. 2 is configured to perform the method 500. More particularly, in one example, the cache controller 216 of the instruction cache 206 performs the method 500.

At 502, the method 500 includes determining whether a cacheline in the instruction cache is newly filled with instruction data. For example, a cacheline may be originally filled into the instruction cache from higher level memory storage, such as from a higher level cache or other memory subsystem. If it is determined that a cache line in the instruction cache is newly filled with instruction data, the method 500 moves to 504. Otherwise, the method 500 returns to 502 to check for cachelines being filled in the instruction cache.

At 504, the method 500 includes setting branch presence bits in the instruction cache for the newly filled instruction data to power up of the branch prediction unit. By setting the presence bits in the instruction cache to power up of the branch prediction unit, a branch prediction may be performed when the instruction data is later fetched from the instruction cache. The method 500 ensures that the branch prediction unit is powered up during at least an initial fetch of the newly filled instruction data in order to generate a branch prediction that may be validated later on in the processing pipeline. The validation of the branch prediction may then be used to update the branch presence bits and control the branch prediction unit during later fetches of that instruction data. In this way, control accuracy of the branch prediction unit may be maintained when instruction data is newly filled in the instruction cache.

Figure 6:
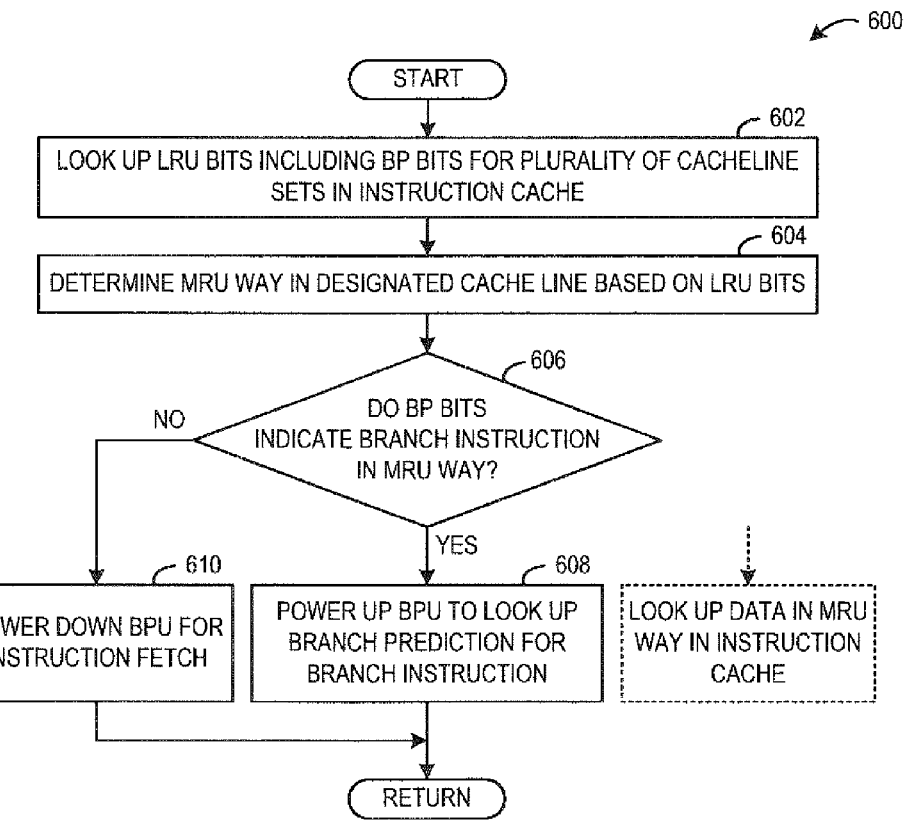

FIG. 6 shows an embodiment of a method 600 for controlling a microprocessor to reduce power consumption. More particularly, the method 600 is performed to reduce power consumption by a branch prediction unit of the microprocessor during sequential instruction fetches from an instruction cache. In one example, the microprocessor 100 shown in FIG. 1 including the instruction cache 206 and the branch prediction unit 220 shown in FIG. 2 is configured to perform the method 600. More particularly, in one example, the cache controller 216 of the instruction cache 206 and the branch controller 232 of the branch prediction unit 220 perform the method 600.

At 602, the method 600 includes looking up, in a least-recently-used bits array of an instruction cache, least-recently-used bits for each of a plurality of cacheline sets in the instruction cache. Looking up the least-recently-used bits includes looking up the branch presence bits for the plurality of cacheline sets. In one example, the plurality of cacheline sets represents sequential entries in the instruction cache. A designated set in the sequence of entries may be specified by an address provided from an instruction fetch operation. In one particular example, looking up the least-recently-used bits includes looking up least-recently-used bits for each of four sequential cacheline sets in the instruction cache. The LRU bits for sequential cacheline sets may be looked up prior to fetching an instruction from one of the cacheline sets in order to predict the way in the set where the instruction is stored.

At 604, the method 600 includes determining a most-recently-used way in a designated cacheline set of the plurality of cacheline sets based on the least-recently-used bits for the designated cacheline. In one example, the designated cacheline set is the set in which an instruction that is currently being fetched is stored. Note that the least-recently-used bits include branch presence bits that indicate whether the most-recently-used way in the designated cacheline set includes a branch instruction.

At 606, the method 600 includes determining whether the branch presence bits for the most-recently-used way in the designated cacheline set indicate that the most-recently-used way includes a branch instruction. In one example, the branch presence bits are received by the branch controller from the cache controller, and the determination is made by the branch controller. If the branch presence bits indicate that the most-recently-used way includes a branch instruction, the method 600 moves to 608. Otherwise, the method 600 moves to 610.

At 608, the method 600 includes powering up the branch prediction unit from a powered-down state to look up a branch prediction for the branch instruction in the instruction data in the most-recently-used way in the designated cacheline set of the instruction cache. In some embodiments, the branch presence bits indicate a type of branch instruction, and the method 600 includes powering up designated prediction structures within the branch prediction unit from a powered-down state based on the type of branch instruction indicated by the branch presence bits. For example, the branch presence bits may indicate that a branch instruction is a direct branch, and the BTB may be powered up to look up a branch prediction while other prediction structures are maintained in a powered-down state.

At 610, the method 600 includes powering down the branch prediction unit or maintaining the branch prediction unit in a powered-down state during the instruction fetch of the instruction data in the most-recently-used way in the designated cacheline set of the instruction cache. In some embodiments, the branch prediction unit is powered up or powered down in parallel with a look up of a data array in the instruction cache that stores the instruction data during an instruction fetch.

By tracking the presence of branch instructions in the instruction cache, the branch prediction unit may be selectively powered down when instruction data that does not include a branch instruction is fetched from the instruction cache during a sequential instruction fetch. Accordingly, power consumption may be reduced relative to a control approach where the branch prediction unit is powered up during every instruction fetch.

Figure 7:
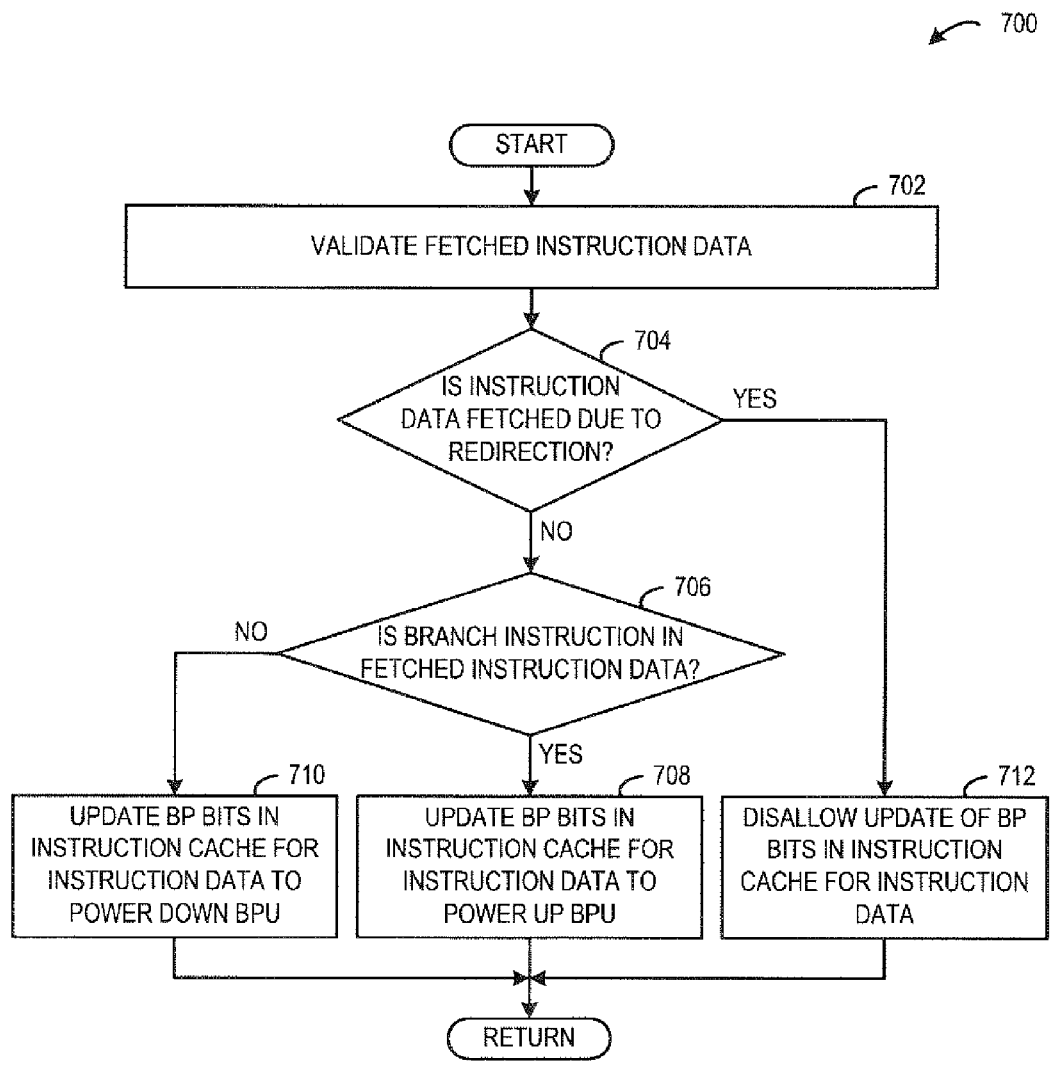

FIG. 7 shows an embodiment of another method 700 for controlling a microprocessor to reduce power consumption. More particularly, the method 700 is performed to validate branch predictions and update presence bits in the instruction cache to accurately reflect the presence of branch instructions in previously fetched instruction data. By updating branch presence bits in the instruction cache control accuracy of the branch prediction unit may be increased, which may result in an increase in performance and a reduction in power consumption. In one example, the microprocessor 100 shown in FIG. 1 including the instruction cache 206, the branch prediction unit 220, and the branch prediction validation unit 234 shown in FIG. 2 is configured to perform the method 700. More particularly, in one example, the cache controller 216 of the instruction cache 206, the branch controller 232 of the branch prediction unit 220, and the branch prediction validation unit 234 perform the method 700.

At 702, the method 700 includes validating fetched instruction data for the presence of a branch instruction. In one example, validating the fetched instruction data may be performed during decode of the instruction data.

At 704, the method 700 includes determining if the instruction data was fetched due to a redirection. If the instruction data was fetched due to a redirection, the method moves to 712. Otherwise, the method 700 moves to 706.

At 706, the method 700 includes determining if the fetched instruction data includes a branch instruction. If there is a branch instruction in the fetched instruction data, the method 700 moves to 708. Otherwise, the method 700 moves to 710.

At 708, the method 700 includes updating the branch presence bits in the instruction cache to power up the branch prediction unit from a powered-down state to look up a branch prediction during a later fetch of that instruction data. In one particular example, updating the branch presence bits includes setting the branch presence bits to indicate that the instruction data includes a branch instruction.

At 710, the method 700 includes updating the branch presence bits in the instruction cache to power down the branch prediction unit or maintain the branch prediction unit in a powered-down state during a later fetch of that instruction data. In one particular example, updating the branch presence bits includes clearing the branch presence bits to indicate that the instruction data does not include a branch instruction.

At 712, the method 700 includes disallowing an update of the branch presence bits. In this case, the update of the branch presence bits is disallowed because the redirection due to the branch instruction may have occurred in the middle of the instruction data. In particular, the validation of the presence of an instruction branch in the instruction data occurs after the point of redirection. If there is a branch instruction in the fetched instruction data at a point before the redirection, it would not be validated and the presence bit could be updated inaccurately. By disallowing an update of presence bits of instruction data that is fetched due to a redirection, the presence bits of fetched instruction data are updated only when all branches in fetched instruction data are considered for validation.

Figure 8:
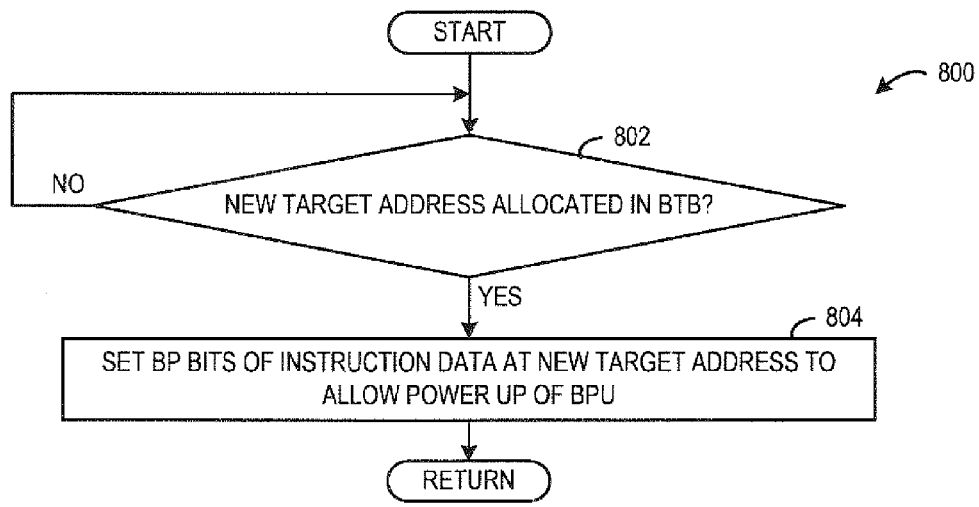

FIG. 8 shows an embodiment of a method 800 for controlling a microprocessor to reduce power consumption. More particularly, the method 800 is performed to make sure that a branch prediction unit is powered up to generate a branch prediction for instruction data at a newly allocated target address in a branch target buffer of the branch prediction unit, when the new instruction data is fetched from an instruction cache. The method 800 may be employed as part of a control strategy to reduce power consumption by a branch prediction unit of the microprocessor during instruction fetches performed after a redirection. In one example, the microprocessor 100 shown in FIG. 1 including the branch prediction unit 220 shown in FIG. 2 is configured to perform the method 800. More particularly, in one example, the branch controller 232 of the branch prediction unit 220 performs the method 800.

At 802, the method 800 includes determining whether a new target address is allocated in the branch prediction unit. In one example, it is determined whether new instruction data is allocated to a target address in a branch target buffer of the branch prediction unit. If it is determined that a new target address is allocated to the branch prediction unit, the method 800 moves to 804. Otherwise, the method 800 returns to 802 to check for new instruction data allocated to the target address in the branch prediction unit.

At 804, the method 800 includes setting branch presence bits for new instruction data at the target address to allow power up of the branch prediction unit when the new instruction data at the target address is fetched from the instruction cache. By setting the presence bits for the new instruction data at the target address in the branch prediction unit to allow power up of the branch prediction unit, a branch prediction may be performed when the instruction data is later fetched from the instruction cache. The branch prediction may be validated later on in the processing pipeline. The validation of the branch prediction may then be used to update the branch presence bits and control the branch prediction unit during later fetches of that instruction data. In this way, control accuracy of the branch prediction unit may be maintained when new instruction data is allocated to a target address in the branch prediction unit.

Figure 9:
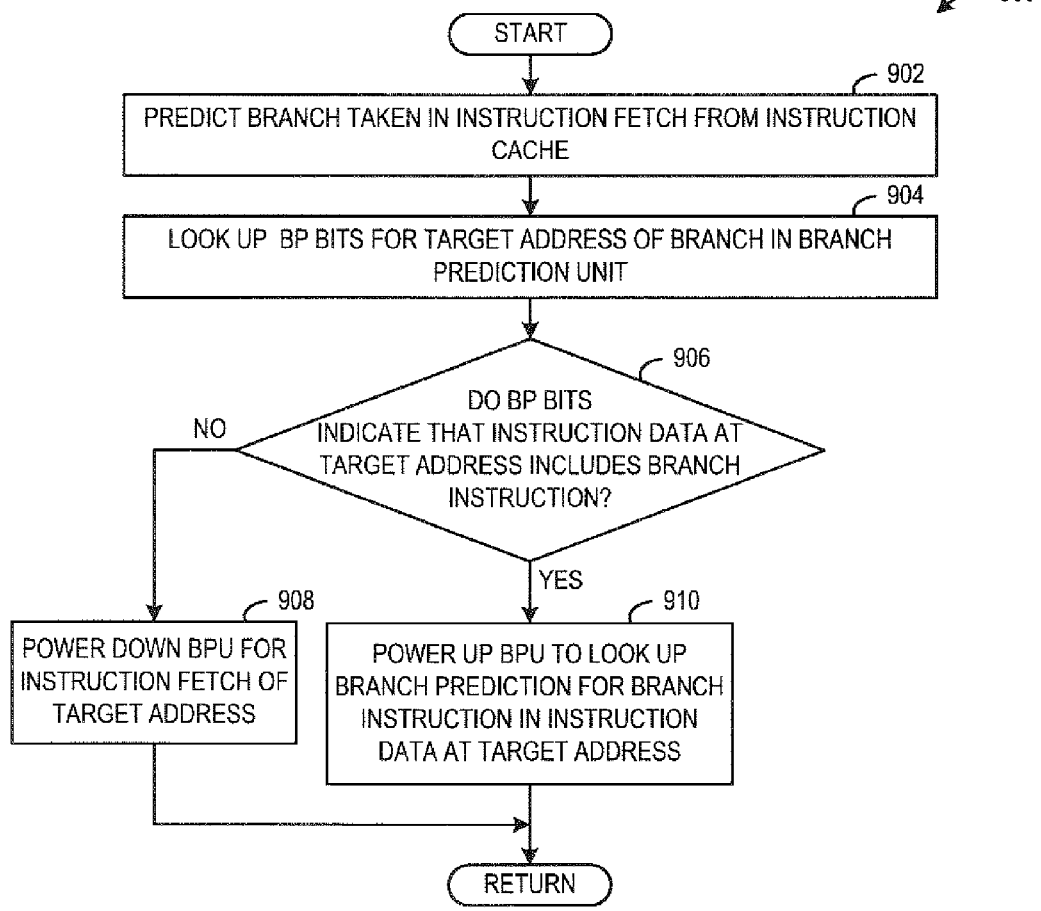

FIG. 9 shows an embodiment of a method 900 for controlling a microprocessor to reduce power consumption. More particularly, the method 900 is performed to reduce power consumption by a branch prediction unit of the microprocessor during instruction fetches following a redirection. In one example, the microprocessor 100 shown in FIG. 1 including the branch prediction unit 220 shown in FIG. 2 is configured to perform the method 900. More particularly, in one example, the branch controller 232 of the branch prediction unit 220 performs the method 900.

At 902, the method 900 includes predicting that a branch will be taken in an instruction fetched from an instruction cache. In one example, the branch prediction unit predicts a branch will be taken by looking up a branch prediction in the branch information buffer alone or in addition to looking up information in other structures of the branch prediction unit.

At 904, the method 900 includes looking up, in the branch target buffer (or the indirect target buffer) of the branch prediction unit, branch presence bits for a target address of the predicted branch.

At 906, the method 900 includes determining whether the presence bits looked up from the branch target buffer indicate that instruction data stored at the target address includes a branch instruction. If the branch presence bits for the target address of the branch indicate that instruction data stored at the target address includes a branch instruction, the method 900 moves 910. Otherwise, the method 900 moves to 908.

At 908, the presence bits indicate that the instruction data at the target address does not include a branch instruction, and the method 900 includes powering down the branch prediction unit or maintaining the branch prediction unit in a powered-down state for the instruction fetch of the instruction data at the target address.

At 910, the presence bits indicate that the instruction data at the target address includes a branch instruction, and the method 900 includes powering up the branch prediction unit from a powered-down state to look up a branch prediction for the branch instruction in the instruction data at the target address. In some embodiments, the branch presence bits indicate a type of branch instruction, and the method 900 includes powering up designated prediction structures within the branch prediction unit from a powered-down state based on the type of branch instruction indicated by the branch presence bits. For example, the branch presence bits may indicate that a branch instruction is a direct branch, and the BTB may be powered up to look up a branch prediction while other prediction structures are maintained in a powered-down state.

By looking up the branch presence bits in the branch prediction unit when a branch is predicted to be taken, the branch prediction unit can be accurately controlled in the clock cycles immediately following a redirection before branch presence bits are available from the instruction cache. Accordingly, needless activations of the branch prediction unit can be reduced even during clock cycles following a redirection.

Figure 10:
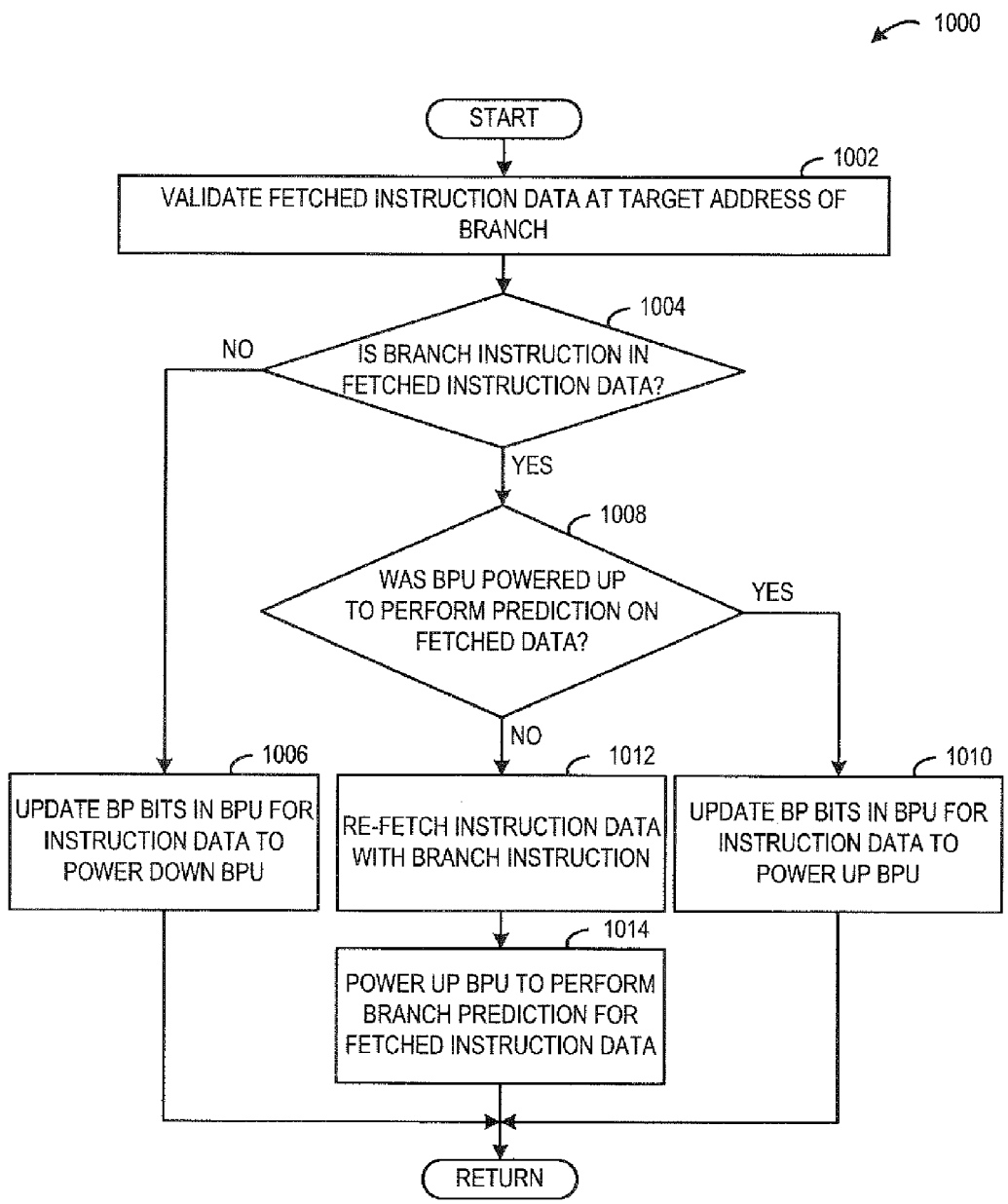

FIG. 10 shows an embodiment of another method 1000 for controlling a microprocessor to reduce power consumption. More particularly, the method 1000 is performed to validate branch predictions and update presence bits in the branch prediction unit to accurately reflect the presence of branch instructions in previously fetched instruction data. By updating branch presence bits in the branch prediction unit, control accuracy of the branch prediction unit may be increased, which may result in an increase in performance and a reduction in power consumption. In one example, the microprocessor 100 shown in FIG. 1 including the branch prediction unit 220 and the branch prediction validation unit 234 shown in FIG. 2 is configured to perform the method 1000. More particularly, in one example, the branch controller 232 of the branch prediction unit 220 and the branch prediction validation unit 234 perform the method 1000.

At 1002, the method 1000 includes validating fetched instruction data at a target address of a branch instruction for the presence of a branch instruction. In one example, validating the fetched instruction data may be performed during decode of the instruction data.

At 1004, the method 1000 includes determining if the fetched instruction data includes a branch instruction based on the validation of the fetched instruction data. If there is no branch instruction in the fetched instruction data, the method 1000 moves to 1006. Otherwise, the method 1000 moves to 1008.

At 1006, the method 1000 includes updating the branch presence bits in the branch prediction unit to power down the branch prediction unit or maintain the branch prediction unit in a powered-down state during a later fetch of the instruction data. In one particular example, updating the branch presence bits includes clearing the branch presence bits to indicate that the instruction data does not include a branch instruction.

At 1008, the method 1000 includes determining whether the branch prediction unit was powered up during a fetch of the instruction data that includes the branch instruction found by 1004. If the branch prediction unit was powered on during the instruction fetch of the instruction data that includes the branch instruction found by 1004, the method 1000 moves to 1010. Otherwise, the method 1000 moves to 1012.

At 1010, the method 1000 includes updating the branch presence bits in the branch prediction unit to power up the branch prediction unit from a powered-down state during a later fetch of the instruction data. In one particular example, updating the branch presence bits includes setting the branch presence bits to indicate that the instruction data includes a branch instruction.

At 1012, the method 1000 includes re-fetching the instruction data including the branch instruction found by 1004. The instruction data is re-fetched so that a branch prediction can be performed on the instruction data.

At 1014, the method 1000 includes powering up the branch prediction unit from a powered-down state to look up a branch prediction for the branch instruction. The re-fetched data may be validated by performing the method 1000 again (or by returning to 1002) and following the flow of the method 1000 to 1010. At 1010, the branch presence bits of the re-fetched instruction data at the target address are updated in the branch prediction unit to indicate that the instruction data at the target address includes a branch instruction.

FIG. 11 shows a timeline of example microprocessor operation according to the present disclosure. The timeline depicts an example pipeline showing instruction cache look ups including LRU array accesses and branch prediction unit look ups. In this example, for purposes of simplicity and clarity, it is assumed that all accesses are hit. Further, each instruction fetch read of the instruction cache retrieves a half of a cacheline of data if there is a hit. In the timeline, time advances from left-to-right and subsequent instruction cache accesses advance from top-to-bottom, although some accesses may be performed in parallel.

In the first clock cycle, a sequential instruction fetch is performed by accessing the low data ways of the designated cacheline set (set 3) of the instruction cache. The LRU bits for a group of the next four sequential cacheline sets after set 3 are looked up in the LRU array including the branch presence bits for the next four sequential cacheline sets. The branch prediction unit is powered down or not accessed because branch presence bits from a previous LRU array look up that included the designated cacheline set indicate that the fetched instruction data does not include an instruction branch. In one example, the branch presence bits include two bits, one for each of data half of the MRU cacheline. In this case, one bit would be clear to indicate that the low data half does not include a branch instruction.

In this example, data is available two clock cycles after a look up is performed. While the accesses from the first clock cycle are being processed, the next sequential instruction fetch is performed. Specifically, in the second clock cycle, the high data ways of set 3 are looked up in the instruction cache. The branch prediction unit is powered up because branch presence bits from a previous LRU array look up that included the LRU bits are set indicating that the fetched instruction data includes a branch instruction. In one example, one bit of two presence bits would be set to indicate that the high data half includes a branch instruction.

In the third clock cycle, the instruction data and the LRU data from the accesses performed in the first clock cycle are available. Since the LRU bits are available, the branch presence bits included with the LRU bits may be used to determine whether to power up or power down the branch prediction unit during the next sequential instruction fetch. In this case, the branch presence bits are clear indicating that the instruction data does not include a branch instruction, and the branch prediction unit is powered down or not accessed during this instruction fetch. Furthermore, the instruction data from the instruction fetch performed in the first clock cycle is available for propagation through stages further down the pipeline.

In the fourth clock cycle, the instruction data from the access to 0xe0 is available. Also, the branch prediction for instruction data at 0x0e0 is available and has a target of 0x200 and branch presence bits for address 0x200 are available from the access of the branch prediction unit in the second clock cycle. Furthermore, the branch presence bits from the branch target buffer of the branch prediction unit indicate that the instruction data at the target address of the branch does not include a branch instruction.

In the fifth clock cycle, the instruction fetch at the target address of the branch is performed by looking up the low data for set 8. The LRU bits for a group of four consecutive cacheline sets (sets 8-11) are looked up in the LRU array including the current cacheline set. In this case, the branch presence bits looked up in the branch target buffer indicate there is no branch in the fetched instruction data, and the branch prediction unit is powered down or not accessed. Furthermore, the instruction data from the instruction fetch performed in the third clock cycle is available although this data will be discarded due to the earlier predicted taken branch. The data and LRU bits looked up in the fifth clock cycle is available in the seventh clock cycle. Instructions fetches may continue sequentially until a redirection due to a branch occurs.

In this example, the branch prediction unit is powered down in the first, third, and fifth clock cycles of the pipeline (highlighted in FIG. 11). This microprocessor control approach optimizes operation of the branch prediction unit to reduce power consumption with a minimal reduction in performance relative to an approach where the branch prediction unit is activated during every instruction fetch. In particular, the approach tracks the presence of branch instructions in fetched instruction data in the form of presence bits that are stored in the instruction cache and the branch prediction unit.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A microprocessor comprising:
fetch logic configured to interact with instruction memory to retrieve instruction data for execution;
a branch prediction unit operatively coupled with the fetch logic, including:
a branch controller configured to (1) receive a branch presence indication that indicates whether instruction data in a location in the instruction memory includes a branch instruction, during a fetch of the instruction data from the location in the instruction memory, (2) power up the branch prediction unit from a powered-down state when the branch presence indication indicates that the instruction data includes a branch instruction, and (3) maintain the branch prediction unit in the powered-down state during the fetch of the instruction data when the branch presence indication indicates that the instruction data does not include a branch instruction.

2. The microprocessor of claim 1, where the instruction memory includes an instruction cache including a plurality of cachelines and a cache controller that is configured to in response to a cacheline in the instruction cache being filled with instruction data, set the branch presence indication for the cacheline to power up of the branch prediction unit to look up a branch prediction during an instruction fetch of instruction data from the cacheline.

3. The microprocessor of claim 2, further comprising:
a branch prediction validation unit configured to (1) after instruction data is fetched from the cacheline, validate the fetched instruction data for the presence of a branch instruction, and (2) if there is no branch instruction in the fetched instruction data, update the branch presence indication to maintain the branch prediction unit in the powered-down state during an instruction fetch of instruction data from the cacheline.

4. The microprocessor of claim 3, where the branch prediction validation unit is configured to if there is a branch instruction in the fetched instruction data, update the branch presence indication to power up the branch prediction unit to look up a branch prediction during an instruction fetch of instruction data from the cacheline.

5. The microprocessor of claim 4, where the cache controller is configured to if instruction data from the cacheline is fetched due to a redirection, disallow an update of the branch presence indication.

6. The microprocessor of claim 1, where the branch prediction unit is powered up or maintained in a powered-down state in parallel with a look up of a data array in an instruction cache that stores the instruction data.

7. The microprocessor of claim 1, where the branch presence indication is characterized by branch presence bits, and where the instruction memory includes an instruction cache that includes a least-recently-used bits array that includes least-recentlyused bits for each of a plurality of cacheline sets and the branch presence bits, and the least recently-used bits for a cacheline set indicate a least-recently-used way in that cacheline set.

8. The microprocessor of claim 7, where the location in the instruction memory is a most-recently-used way in a designated cacheline set of the instruction cache, and the branch presence bits for the designated cacheline set are fetched prior to an instruction fetch of the instruction data from the most-recently-used way.

9. The microprocessor of claim 1, where the branch presence indication indicates a type of branch instruction and the branch controller is configured to power up designated prediction structures within the branch prediction unit from a powered-down state based on the type of branch instruction indicated by the branch presence bits.

10. The microprocessor of claim 1, where the branch presence indication is characterized by two branch presence bits, each of the two branch presence bits representing a different data half of a cacheline.

11. A method implemented in a microprocessor including a branch prediction unit and instruction memory, the method comprising:
receiving a branch presence indication that indicates whether instruction data in a location in the instruction memory includes a branch instruction;
during a fetch of the instruction data from the location in the instruction memory, powering up the branch prediction unit from a powered-down state when the branch presence indication indicates that the instruction data includes a branch instruction; and
maintaining the branch prediction unit in the powered-down state during the fetch of the instruction data when the branch presence indication indicates that the instruction data does not include a branch instruction.

12. The method of claim 11, where the instruction memory includes an instruction cache including a plurality of cachelines, further comprising:
in response to a cacheline in the instruction cache being filled with instruction data, setting the branch presence indication for the cacheline to power up of the branch prediction unit to look up a branch prediction during an instruction fetch of instruction data from the cacheline.

13. The method of claim 12, further comprising:
after instruction data in the cache line is fetched from the instruction cache, validating the fetched instruction data for the presence of a branch instruction;
if there is no branch instruction in the fetched instruction data, updating the branch presence indication to maintain the branch prediction unit in the powered-down state during an instruction fetch of instruction data from the cacheline; and
if there is a branch instruction in the fetched instruction data, updating the branch presence indication to power up the branch prediction unit to look up a branch prediction during an instruction fetch of instruction data from the cacheline.

14. The method of claim 13, further comprising:
if instruction data from the cacheline is fetched due to a redirection, disallowing an update of the branch presence indication.

15. The method of claim 11, where the branch prediction unit is powered up or maintained in a powered-down state in parallel with a look up of a data array in an instruction cache that stores the instruction data.

16. The method of claim 11, where the branch presence indication indicates a type of branch instruction, further comprising:
powering up designated prediction structures within the branch prediction unit from a powered-down state based on the type of branch instruction indicated by the branch presence indication.

17. The method of claim 11, where receiving the branch presence indication is performed prior to powering up the branch prediction unit or maintaining the branch prediction unit in the powered down state.

18. A method implemented in a microprocessor including an instruction cache and a branch prediction unit, the instruction cache including a plurality of cacheline sets and branch presence bits corresponding to each of the plurality of cacheline sets, where the branch presence bits indicate whether data in a most-recently-used way in a corresponding cacheline set includes a branch instruction, the method comprising:

receiving branch presence bits that indicate whether a cacheline in a designated cacheline set includes a branch instruction;

during an instruction fetch of instruction data from the cacheline, powering up the branch prediction unit from a powered-down state when the branch presence bits indicate that the instruction data from the cacheline includes a branch instruction;

maintaining the branch prediction unit in the powered-down state during the instruction fetch of instruction data from the cacheline when the branch presence bits indicate that the instruction data from the cacheline does not include a branch instruction;

after instruction data in the cache line is fetched from the instruction cache, validating the fetched instruction data for the presence of a branch instruction;

if there is no branch instruction in the fetched instruction data, updating the branch presence bits to maintain the branch prediction unit in the powered-down state during an instruction fetch of instruction data from the cacheline; and if there is a branch instruction in the fetched instruction data, updating the branch presence bits to power up the branch prediction unit to look up a branch prediction during an instruction fetch of instruction data from the cacheline.

19. The method of claim 18, further comprising:
if instruction data from the cacheline is fetched due to a redirection, disallowing an update of the branch presence bits.

20. The method of claim 18, where the branch presence bits indicate a type of branch instruction, and the method includes:

powering up designated prediction structures within the branch prediction unit from a powered-down state based on the type of branch instruction indicated by the branch presence bits.

21. A method comprising:
maintaining a branch prediction unit in a powered-down state during an instruction fetch of instruction data from an instruction cache based on at least one branch presence bit indicating that the instruction data does not include a branch instruction; and during a fetch of the instruction data from the instruction cache, powering up the branch prediction unit from a powered-down state when the branch presence indication indicates that the instruction data includes a branch instruction.

* * * * *